United States Patent
Suda et al.

(10) Patent No.: US 8,828,106 B2
(45) Date of Patent: Sep. 9, 2014

(54) CIRCULATING FLUIDIZED-BED REFORMER

(75) Inventors: Toshiyuki Suda, Tokyo (JP); Tetsuya Hirata, Tokyo (JP); Toshiro Fujimori, Tokyo (JP); Hideto Ikeda, Tokyo (JP)

(73) Assignee: IHI Corporation, Tokyo (JP)

( * ) Notice: Subject to any disclaimer, the term of this patent is extended or adjusted under 35 U.S.C. 154(b) by 456 days.

(21) Appl. No.: 12/681,780

(22) PCT Filed: Nov. 12, 2008

(86) PCT No.: PCT/JP2008/003277
§ 371 (c)(1),
(2), (4) Date: Apr. 6, 2010

(87) PCT Pub. No.: WO2009/063625
PCT Pub. Date: May 22, 2009

(65) Prior Publication Data
US 2010/0221152 A1    Sep. 2, 2010

(30) Foreign Application Priority Data
Nov. 14, 2007  (JP) ................................ 2007-295159

(51) Int. Cl.
*B01J 7/00*      (2006.01)
*C01B 6/24*      (2006.01)
*C10J 3/46*      (2006.01)
*C01B 3/02*      (2006.01)

(52) U.S. Cl.
USPC .............. 48/61; 48/197 R; 422/139; 422/625; 423/644; 423/648.1

(58) Field of Classification Search
CPC ...... C10J 3/482; C10J 3/50; C10J 2300/0993; C10J 2300/12
USPC .............................................................. 48/61
See application file for complete search history.

(56) References Cited

U.S. PATENT DOCUMENTS

| 4,046,523 A * | 9/1977 | Kalina et al. ................. 48/197 R |
| 4,519,810 A * | 5/1985 | Haas ............................... 48/202 |
| 6,005,149 A * | 12/1999 | Bishop .......................... 585/241 |
| 6,852,215 B2 | 2/2005 | Wen et al. |
| 2003/0035983 A1* | 2/2003 | Ukai et al. ....................... 429/17 |

FOREIGN PATENT DOCUMENTS

| JP | 61 186202 | 8/1986 |
| JP | 7 505570 | 6/1995 |
| JP | 2000-185905 | 7/2000 |
| JP | 2001-354405 | 12/2001 |
| JP | 2003 95614 | 4/2003 |
| JP | 2006-63290 | 3/2006 |

* cited by examiner

*Primary Examiner* — Matthew Merkling
(74) *Attorney, Agent, or Firm* — Oblon, Spivak, McClelland, Maier & Neustadt, L.L.P.

(57) ABSTRACT

Inexpensive heating fuel is used to generate heat required for completion of reformation of raw material to be reformed such as hydrocarbon gas, heavy oil or oil refining pitch so that the raw material may be reformed economically and stably. A reformer has a raw material feeder that feeds a predetermined amount of raw material to be reformed to a fluidized-bed reforming furnace; a fuel feeder feeds heating fuel to a fluidized-bed combustion furnace; and a controller regulates the fuel to be fed to the combustion furnace so as to impart heat to the circulating particles in the combustion furnace such that the raw material fed to the reforming furnace can be completely reformed in the reforming furnace.

5 Claims, 2 Drawing Sheets

CIRCULATING FLUIDIZED-BED REFORMER

TECHNICAL FIELD

The present invention relates to a circulating fluidized-bed reformer and more specifically relates to a circulating fluidized-bed reformer which can utilize inexpensive heating fuel to generate heat required for completion of reformation of raw material to be reformed so that the raw material such as hydrocarbon gas, heavy oil and/or oil refining pitch can be reformed economically and stably to increase production of reformed gas.

BACKGROUND ART

There is a conventional reforming furnace comprising a number of reaction pipes in the furnace and a number of burners on a furnace wall for uniform heating of the furnace, which is disclosed in, for example, Patent Literature 1. Such conventional reforming furnace is, however, disadvantageous in that it is much complex in structure, that complicated control is required for the uniform heating and that running cost is increased since only fuel gas, which is expensive, is usually used for the burners so as to attain the uniform burning.

In order to overcome these, there has been recently proposed a fluidized-bed employing reformer as disclosed in, for example, Patent Literature 2 or 3.

In Patent Literature 2, arranged side by side are a fluidized-bed heat decomposition gasification furnace for production of valuable gas or oil through feeding of solid or liquid raw material and a fluidized-bed combustion furnace for heating of circulating particles by combustion of carbon-containing residue and other flammable materials produced in the gasification furnace, the heated circulating particles in the combustion furnace being moved to the gasification furnace to heat the raw material.

In Patent Literature 3, raw material to be reformed which is a combination of hydrocarbon with steam is heated and reformed in a fluidized-bed catalyst reactor using catalyst particles, resultant reformed gas being used as fuel for a fuel cell. The catalyst particles separated from the reformed gas is guided to a heat exchanger where off gas from the fuel cell and free from hydrogen is burned to directly heat the catalyst particles, the heated catalyst particles being fed to the fluidized-bed catalyst reactor.
[Patent Literature 1] JP 2000-185905A
[Patent Literature 2] JP 2006-63290A
[Patent Literature 3] JP 2001-354405A

SUMMARY OF INVENTION

Technical Problems

Reformation of raw material by the reformer as shown in Patent Literature 2 or 3 involves an endothermic reaction so that heat required for the reformation has to be supplied. The required heat for the reformation is imparted in Patent Literature 2 by means of the fluidized-bed combustion furnace and in Patent Literature 3 by means of the heat exchanger; in either case, it is disadvantageously difficult to balance a supply of the raw material to be reformed with heat required for the reformation.

Specifically, in Patent Literature 2, it is intended that the residue of the raw material in the heat decomposition gasification furnace is moved together with the circulating particles to the adjacent fluidized-bed combustion furnace where the circulating particles heated by combustion of the residue is moved to the gasification furnace to attain movement of sensible heat. It is also intended that supplies of fluidizing gases by air diffusers arranged at opposite sides of a partition are varied to vary an amount of the circulating particles moving between the chambers through an opening on the partition, this feature being utilized to control the amount of the circulating particles moved between the chambers, i.e., the circulating amount of the circulating particles. However, in Patent Literature 2, movements of the residue and of the circulating particles must be interlaced between the heat decomposition gasification and fluidized-bed combustion furnaces; favorable movements of the residue and of the circulating particles in mutually opposite directions is hard to attain so that it is difficult to favorably balance the supply of the raw material with the heat required for the reformation. Further, in Patent Literature 2, part of the raw material is used as fuel for generation of heat for the reformation, which causes a problem that an amount of reformed gas produced from the raw material is substantially reduced.

In Patent Literature 3, it is disclosed that off gas from the fuel cell is burned in the heat exchanger to obtain heat required for the reformation and that the heat imparted by the off gas only will not suffice for the reformation, resulting in shortage of heat. Thus, also in Patent Literature 3, disadvantageously the supply of the raw material is not balanced with the heat required for the reformation. In order to overcome this, it is disclosed in Patent Literature 3 that the fluidized-bed catalyst reactor is provided with an outer heating device such as a jacket structure or a heat exchanger so as to obtain heat from outside. However, such provision of the outer heating device is disadvantageous in structural complication and in that running cost is increased since a separate heat source is required for heating from outside.

Thus, in the reformer as shown in the above-mentioned Patent Literature 2 or 3, the supply of the raw material is hardly balanced with the heat required for the reformation and to freely control them cannot be attained, so that the raw material cannot be reformed inexpensively and effectively to enhance productivity of reformed gas.

The invention was made in view of the above and has its object to provide a circulating fluidized-bed reformer which can utilize inexpensive heating fuel to generate heat required for completion of reformation of raw material to be reformed so that the raw material such as hydrocarbon gas, heavy oil and/or oil refining pitch can be reformed economically and stably to increase production of reformed gas.

Solution to Problems

The invention is directed to a circulating fluidized-bed reformer comprising a fluidized-bed reforming furnace for heating, through circulating particles, a raw material to be reformed fed together with steam to reform the raw material into reformed gas, a fluidized-bed combustion furnace for heating the circulating particles guided from the fluidized-bed reforming furnace through combustion of heating fuel and a separator for separating high-temperature fluid discharged and guided from the fluidized-bed combustion furnace into exhaust combustion gas and the circulating particles to feed the separated circulating particles into said fluidized-bed reforming furnace, characterized by comprising a raw material feeder for feeding a predetermined amount of raw material to be reformed to the fluidized-bed reforming furnace, a fuel feeder for feeding heating fuel to the fluidized-bed combustion furnace and a controller for regulating the heating fuel to be fed to the fluidized-bed combustion furnace so as to impart heat to the circulating particles in the fluidized-bed combustion furnace in such a manner that the raw material fed to the fluidized-bed reforming furnace can be completely reformed in the fluidized-bed reforming furnace.

It is preferable in the above-mentioned circulating fluidized-bed reformer that air regulating means is provided for regulating fluidizing air to be fed to said fluidized-bed combustion furnace, a circulating amount of the circulating particles between the fluidized-bed combustion and reforming furnaces being regulated by the air regulating means.

It is preferable in the above-mentioned circulating fluidized-bed reformer that a temperature sensor is provided for sensing temperature in said fluidized-bed reforming furnace, supply of the heating fuel to the fluidized-bed combustion furnace being regulated such that temperature sensed by said temperature sensor is kept to a predetermined temperature.

It is preferable in the above-mentioned circulating fluidized-bed reformer that concentration sensing means is provided for sensing concentration of the reformed gas at an outlet of said fluidized-bed reforming furnace, supply of the heating fuel to fluidized-bed combustion furnace being regulated such that the concentration sensed by said concentration sensing means is kept to a predetermined concentration.

It is preferable in the above-mentioned circulating fluidized-bed reformer that a temperature sensor is provided for sensing temperature in said fluidized-bed reforming furnace, supply of the heating fluid to the fluidized-bed combustion furnace being adjusted such that the temperature sensed by said temperature sensor is kept to a predetermined temperature, and that concentration sensing means is provided for sensing concentration of the reformed gas at an outlet of said fluidized-bed reforming furnace, supply of the heating fuel to the fluidized-bed combustion furnace is adjusted such that the concentration sensed by said concentration sensing means is kept to a predetermined concentration.

It is preferable in the above-mentioned circulating fluidized-bed reformer that the raw material fed to said fluidized-bed reforming furnace is at least one of hydrocarbon gas, heavy oil and oil refining pitch.

It is preferable in the above-mentioned circulating fluidized-bed reformer that the heating fuel fed to said fluidized-bed combustion furnace is at least one of waste, sludge, coal and said raw material to be reformed.

It is preferable in the above-mentioned circulating fluidized-bed reformer that said circulating particles are of catalyst having reformation stimulating activity.

Advantageous Effects of Invention

A circulating fluidized-bed reformer according to the invention, in which a predetermined amount of raw material to be reformed is fed by a raw material feeder to a fluidized-bed reforming furnace while heating fuel is fed by a fuel feeder to a fluidized-bed combustion furnace so as to impart heat to the circulating particles in such a manner that the raw material fed to the fluidized-bed reforming furnace can be completely reformed in the fluidized-bed reforming furnace, can exert excellent effects that supply of the raw material can be easily balanced with heat required for the reformation, that the raw material such as hydrocarbon gas, heavy oil and/or oil refining pitch can be economically reformed using inexpensive or surplus heating fuel and that all of the raw material can be reformed stably to increase production of reformed gas.

Figure 1:
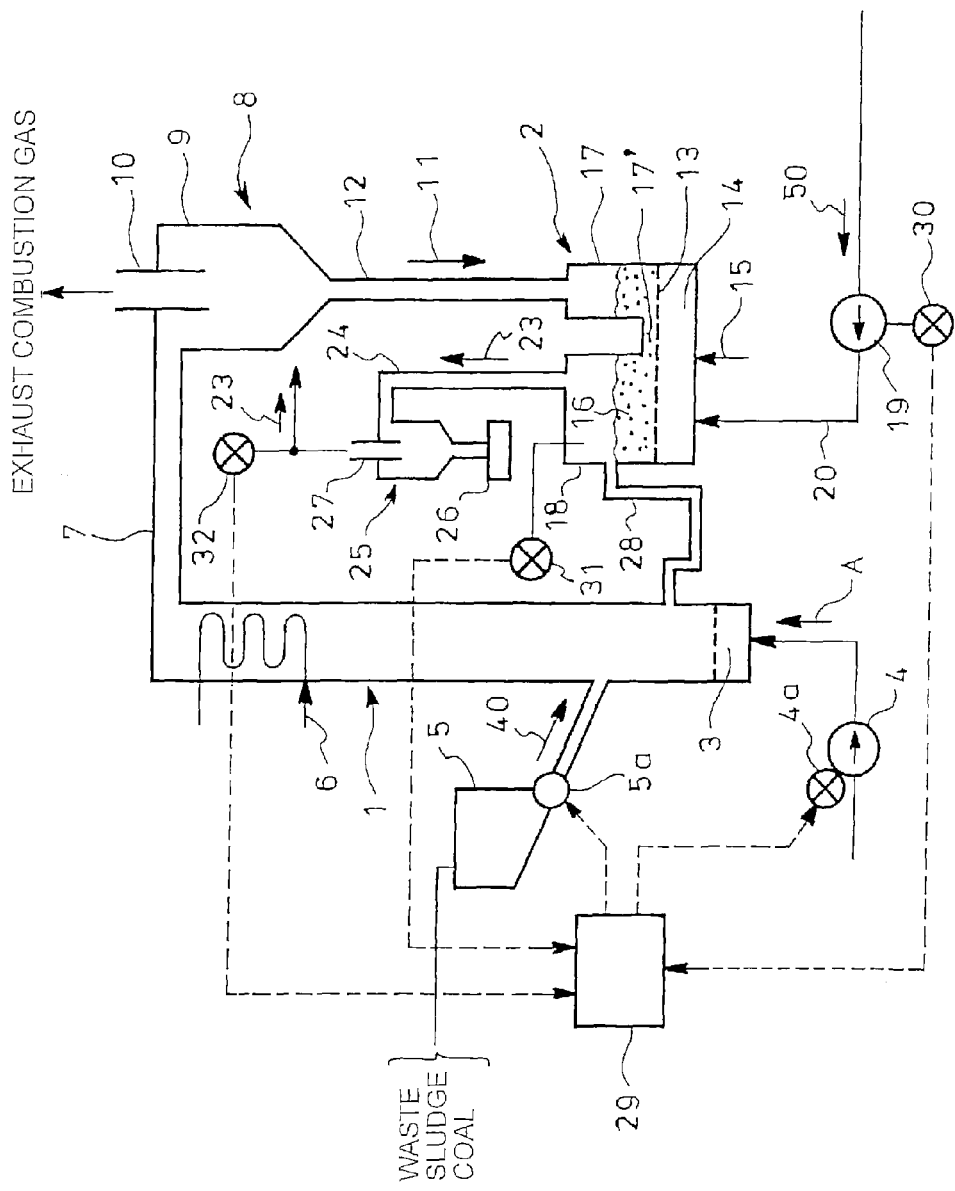
FIG. 1 is a flow sheet showing an embodiment of the invention.

REFERENCE SIGNS LIST 1 fluidized-bed combustion furnace
2 fluidized-bed reforming furnace
4a air regulating means
5 fuel feeder
8 separator
11 circulating particles
15 steam
19 raw material feeder
23 reformed gas
29 controller
30 raw material supply sensor
31 temperature sensor
32 concentration sensing means
40 heating fuel
50 raw material to be reformed
A fluidizing air

DESCRIPTION OF EMBODIMENT

An embodiment of the invention will be described in conjunction with the attached drawings.

FIG. 1 shows the embodiment of a circulating fluidized-bed reformer according to the invention. In the figure, reference numeral 1 denotes a fluidized-bed combustion furnace with a lower portion to which circulating particles such as sand are guided from a fluidized-bed reforming furnace 2. The lower portion of the fluidized-bed combustion furnace 1 is provided with a wind box 3 to which fluidizing air A is supplied by an air feeder 4 such as fan and by air regulating means 4a such as adjustment vanes associated with the air feeder 4. By blowing of the fluidizing air A, circulating particles in the fluidized-bed combustion furnace 1 are fluidized at high speed, and heating fuel 40 fed by fuel regulating means 5a associated with a fuel feeder 5 into the lower portion of the furnace undergoes fluidized combustion to heat the circulating particles. Reference numeral 6 denotes a heat exchanger for heat recovery at a top of the fluidized-bed combustion furnace 1. As the circulating particles, for example, nickel or other metal catalyst may be used which has reformation stimulating activity.

The top of the fluidized-bed combustion furnace 1 is connected with a transfer pipe 7 for taking out high-temperature fluid which in turn is connected with a cyclone separator 8 comprising outer and inner cylinders 9 and 10, respectively. High-temperature fluid in the transfer pipe 7 is tangentially guided into and centrifuged by the outer cylinder 9 so that exhaust combustion gas and ash with finer diameter are discharged upward through the inner cylinder 10 whereas circulating particles 11 with greater diameter are fed, through a fall pipe 12 connected with the separator 8, to the fluidized-bed reforming furnace 2 at the bottom.

In the fluidized-bed reforming furnace 2, steam 15 or other gasification agent is fed to a wind box 14 at the bottom zoned by an air diffuser 13; the steam 15 is ejected up from the air diffuser 13 to fluidize the circulating particles 11 at the upper side to thereby form a fluidized bed 16. Formed on the air diffuser 13 is a particle introductory section 17 to which the circulating particles 11 separated by the separator 8 is fed. A communication section 17' confined near the air diffuser 13 intercommunicates the particle introductory section 17 and the fluidized bed 16 to provide a reformation section 18.

Fed by a raw material feeder 19 to the fluidized-bed reforming furnace 2 is a predetermined amount of raw material 50 to be reformed. As the raw material 50, gas 50a such as hydrocarbon gas ($CH_4$) or liquid 50b such as heavy oil or oil refining pitch taken out constantly or as surplus from various plants may be employed. Thus, it is much beneficial that hydrocarbon gas, heavy oil, oil refining pitch or other carbon-containing material which becomes unnecessary or surplus in the plants is utilized as raw material 50 and reformed to produce, for example, hydrogen ($H_2$) prevailing reformed gas.

Figure 2:
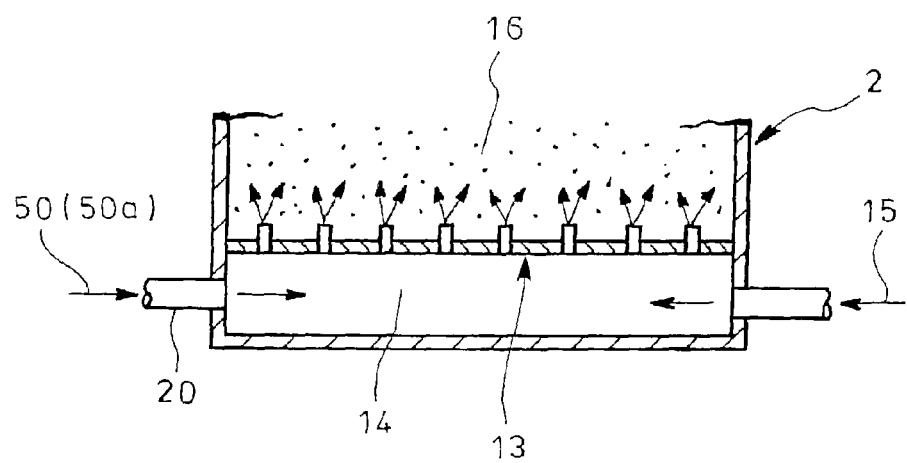
FIG. 2 is a side view in section showing an application where the raw material, which is gas, is supplied to the fluidized-bed reforming furnace.

FIG. 2 shows a case where the raw material 50 to be reformed is gas 50a or hydrocarbon gas to be fed to the fluidized-bed reforming furnace 2, the raw material 50 to be reformed or gas 50a being fed by feed pipes 20 to the wind box 14 of the fluidized-bed reforming furnace 2. The hydrocarbon gas fed to the wind box 14 is effectively mixed with the steam 15 and ejected up through the air diffuser 13 to provide the fluidized bed 16. Thus, it is effective to feed hydrocarbon gas to the wind box 14 since mixed degree with the steam 15 can be enhanced; alternatively, the hydrocarbon gas may be directly fed to the fluidized bed 16.

Figure 3:
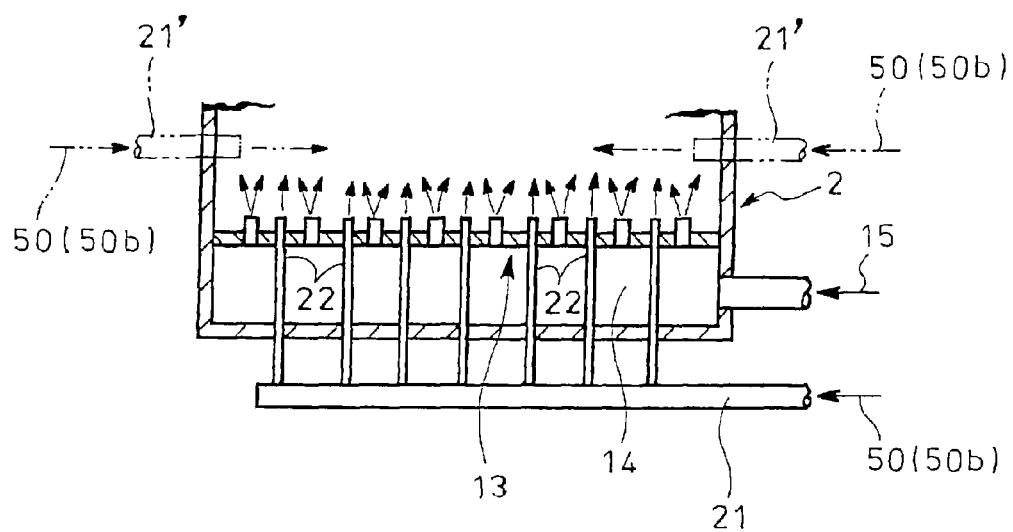
FIG. 3 is a side view in section showing an application where the raw material, which is liquid, is supplied to the fluidized-bed reforming furnace.

FIG. 3 shows a case where the raw material 50 to be reformed is liquid 50b such as heavy oil or oil refining pitch to be fed to the fluidized-bed reforming furnace 2, raw material 50 to be reformed or liquid 50b being blown into the upper fluidized bed 16 by raw-material blowing nozzles 22 branched from the feed pipe 21 and extending through the air diffuser 13. Alternatively, the raw material 50 to be reformed or liquid 50b may be directly fed to the fluidized bed 16 on the air diffuser 13, as shown in FIG. 3 by imaginary lines, through raw material feed pipes 21'. The raw material 50 to be reformed may be fed throughout the fluidized-bed reforming furnace 2; alternatively, it may be fed only to the reformation section 18 shown in FIG. 1.

In the fluidized-bed reforming furnace 2, the fluidized bed 16 is provided by the steam 15 blown from the air diffuser 13 and the high-temperature circulating particles 11 fed from the separator 8, so that the raw material 50 fed by the raw material feeder 19 into the fluidized bed 16 is heated in the presence of the steam 15 and reformed into, for example, hydrogen ($H_2$) prevailing reformed gas 23. In this case, even if pressure in the reformation section 18 is increased by reformation of the raw material 50, the particle introductory section 17 and the reformation section 18 are intercommunicated through the communication section 17' in the fluidized bed 16 so that there does not occur the problem of the circulating particles 11 in the reformation section 18 flowing back into the separator 8.

The reformed gas 23 produced in the reformation section 18 is guided by a discharge pipe 24 into a recovery section 25 where fine powder 26 entrained in the reformed gas 23 is removed, the reformed gas 23 thus free from the fine powder being discharged through an inner pipe 27 to a targeted site for utilization.

The circulating particles 11 which is lowered in temperature through heat removal by the reformation reaction (endothermic reaction) in the reformation section 18 is returned by an overflow pipe 28 to the fluidized-bed combustion furnace 1 where it is heated again.

Since the fluidized combustion is conducted in fluidized-bed combustion furnace 1, any fuel can be favorably burned irrespective of fuel kind such as gas, liquid or solid; as a result, fuel such as waste, sludge or coal which is low in quality and is inexpensively available may be used as the heating fuel 40 fed from the fuel feeder 5 to the fluidized-bed combustion furnace 1 to attain stable combustion. If the above-mentioned raw material 50 to be reformed is superabundant, such hydrocarbon gas, heavy oil or oil refining pitch may be used as heating fuel 40.

As the heating fuel 40 to be fed to the fluidized-bed combustion furnace 1, one of waste, sludge, coal, hydrocarbon gas, heavy oil, oil refining pitch and etc. may be selected to be fed; alternatively, a plurality of kinds of them may be concurrently fed for combustion.

In the figure, reference numeral 29 denotes a controller. The controller 29 controls the air regulating means 4a to set a circulating amount of the circulating particles 11 between the fluidized-bed combustion and reformation furnaces 1 and 2 to a predetermined amount.

Inputted to the controller 29 is a detection signal from a raw material supply sensor 30 which senses the supply of the raw material 50 by the raw material feeder 19. In accordance with the supply of raw material 50 fed by the raw material feeder 19 to the fluidized-bed reforming furnace 2 sensed by the raw material supply sensor 30, the fuel regulating means 5a is regulated to control the supply of the heating fuel 40 to the fluidized-bed combustion furnace 1. Thus, the heating fuel 40 to be fed to the fluidized-bed combustion furnace 1 is regulated so as to impart heat to the circulating particles 11 in the fluidized-bed combustion furnace 1 in such a manner that the raw material 50 fed to the fluidized-bed reforming furnace 2 can be completely reformed in the fluidized-bed reforming furnace 2.

Further, the temperature sensor 31 is provided for sensing the temperature in the fluidized-bed reforming furnace 2, the temperature sensed by the sensor 31 being inputted into the controller 29, the controller 29 being adapted to correct the fuel regulating means 5a so as to keep the temperature in the fluidized-bed reforming furnace 2 to a predetermined temperature.

The temperature sensor 31 may be replaced by concentration sensing means 32 which senses, in use of a concentration meter or through analysis, concentration of the reformed gas 23 at an outlet of the fluidized-bed reforming furnace 2; fuel regulating means 5a of the fuel feeder 5 can be corrected so as to keep the sensed concentration of the concentration sensing means 32 to a predetermined concentration.

Next, mode of operation of the embodiment shown in FIG. 1 will be described.

Into the lower portion of the fluidized-bed combustion furnace 1, the fluidizing air A from the air feeder 4 is blown through the wind box 3 and the heating fuel 40 such as waste, sludge or coal is fed from the fuel regulating means 5a of the fuel feeder 5; in the fluidized-bed combustion furnace 1, the circulating particles are heated through fluidized combustion of the heating fuel 40. The high-temperature fluid in the fluidized-bed combustion furnace 1 is guided through the transfer pipe 7 into the separator 8 where it is separated into the exhaust combustion gas and the circulating particles 11, the separated circulating particles 11 being fed through the fall pipe 12 into the particle introductory section 17 in the fluidized-bed reforming furnace 2.

Since the steam 15 (reforming agent) is guided into the wind box 14 in the fluidized-bed reforming furnace 2, the circulating particles 11 fed to the particle introductory section 17 is fluidized and moved through the communication section 17' to the reformation section 18. Thus, when the raw material 50 such as hydrocarbon gas, heavy oil or oil refining pitch is fed by the raw material feeder 19 into the fluidized-bed reforming furnace 2, the raw material 50 is reformed by heating through the circulating particles 11 constituting the fluidized bed 16 and due to existence of the steam 15 to produce, for example, hydrogen-prevailing reformed gas 23. The reformed gas 23 produced is taken out through the recovery section 25. In this case, as the circulating particles, nickel or other metal catalyst having reformation stimulating activity may be used, which can further facilitate reformation reaction of the raw material 50 to be reformed.

The circulating particles 11 which is lowered in temperature due to heat transfer for the reformation reaction (endothermic reaction) in the reformation section 18 is returned through an overflow pipe 28 to the fluidized-bed combustion furnace 1 so as to be heated again.

In the above, through control of the air regulating means 4a, the controller 29 sets the circulating amount of the circulating particles 11 between the fluidized-bed combustion and reforming furnaces 1 and 2. Since the fluidized-bed reforming furnace 2 is lowered in temperature by feeding of the raw material 50 and is further lowered in temperature by endotherm due to the reformation reaction, the circulating amount of the circulating particles 11 is controlled in such a manner that temperature for maintaining favorable reformation is to be kept in the fluidized-bed reforming furnace 2 in accordance with expected supply of the raw material 50. As the circulated amount of the circulating particles 11 is increased or decreased, the temperature of the reformation section 18 is increased or decreased accordingly.

Inputted to the controller 29 is the detection signal from the raw material supply sensor 30 which senses the supply of the raw material 50 by the raw material feeder 19; the controller 29 regulates the supply of the heating fuel 40 to the fluidized-bed combustion furnace 1 by the fuel regulating means 5a in accordance with the supply of the raw material 50 by the raw material feeder 19. In this case, the controller 29 regulates the supply of the heating fuel 40 so as to impart heat to the circulating particles 11 in the fluidized-bed combustion furnace 1 in such a manner that the raw material 50 can be completely reformed in the fluidized-bed reforming furnace 2.

Thus, since the supply of the heating fuel 40 to the fluidized-bed combustion furnace 1 is controlled such that the raw material 50 can be completely reformed in the fluidized-bed reforming furnace 2, the raw material 50 supplied to the fluidized-bed reforming furnace 2 is substantially completely reformed, so that production of, for example, hydrogen-prevailing reformed gas 23 taken out from the fluidized-bed reforming furnace 2 is increased. In this case, residue not reformed out in the fluidized-bed reforming furnace 2 is supplied together with the circulating particles 11 through the overflow pipe 28 to the fluidized-bed combustion furnace 1 for combustion.

It is expected that the temperature in the fluidized-bed reforming furnace 2 may vary depending upon, for example, variation in supply or property of the raw material 50 to be reformed. In this case, since the sensed temperature from the temperature sensor 31 sensing the temperature in the fluidized-bed reforming furnace 2 is inputted to the controller 29 which in turn corrects the fuel regulating means 5a for regulation so as to keep the sensed temperature from the temperature sensor 31 to a predetermined temperature, the temperature in the fluidized-bed reforming furnace 2 is stably and constantly kept to a temperature suitable for reformation; as a result, the reformed gas 23 with stable nature can be constantly produced in the fluidized-bed reforming furnace 2. Alternatively, the temperature sensor 31 may be replaced by the concentration sensing means 32 which senses concentration of the reformed gas 23 at the outlet of the fluidized-bed reforming furnace 2; the concentration of the reformed gas 23 can be controlled to be constantly kept to a predetermined concentration by inputting the sensed concentration of the concentration sensing means 32 to the controller 29.

As mentioned in the above, according to the invention, for the fluidized-bed reforming furnace 2, carbon-containing gas or liquid such as hydrocarbon gas, heavy oil or oil refining pitch which is constantly discharged from or surplus in various plants is used as raw material 50 to be reformed, so that the carbon-containing matter can be used for production of effective, for example, hydrogen-prevailing reformed gas 23 and most of the raw material 50 to be reformed is reformed in the fluidized-bed reforming furnace 2. As a result, production of, for example, hydrogen-prevailing reformed gas 23 can be substantially increased.

The fluidized-bed combustion furnace 1, in which fluidized combustion is conducted, can favorably burn any material irrespective of the fact that it is gas, liquid or solid. Thus, in the invention, fuel such as waste, sludge or coal, which has relatively low in quality as fuel and is available inexpensively, may be used as heating fuel 40 to be fed to the fluidized-bed combustion furnace 1, so that reformation of said raw material 50 can be conducted inexpensively.

It is to be understood that a circulating fluidized-bed reformer according to the invention is not limited to the above embodiment and that various changes and modifications may be made without departing from the scope of the invention.

INDUSTRIAL APPLICABILITY

A circulating fluidized-bed reformer according to the invention is applicable when the supply of raw material is to be balanced with heat required for reformation, when the raw material such as hydrocarbon gas, heavy oil or oil refining pitch is to be economically reformed using inexpensive or surplus heating fuel and when production of reformed gas by the raw material to be reformed is to be increased.

The invention claimed is:

1. A circulating fluidized-bed reformer comprising:
a fluidized-bed reforming furnace for heating, through circulating particles, a raw material to be reformed fed together with steam to reform the raw material into reformed gas,
a fluidized-bed combustion furnace for heating the circulating particles guided through an overflow pipe from the fluidized-bed reforming furnace through combustion of heating fuel,
a separator for separating high-temperature fluid discharged and guided from the fluidized-bed combustion furnace into exhaust combustion gas and the circulating particles to feed the separated circulating particles through a fall pipe and through a particle introductory section into a fluidized bed in said fluidized-bed reforming furnace arranged at a bottom of the fall pipe, said particle introductory section being formed at an upper side of said fluidized-bed reforming furnace,
a raw material feeder for feeding a predetermined amount of raw material to be reformed to the fluidized-bed reforming furnace,
a fuel feeder for feeding heating fuel to the fluidized-bed combustion furnace,
a temperature sensor provided for sensing a temperature in said fluidized-bed reforming furnace,
a concentration sensor provided for sensing a concentration of the reformed gas at an outlet of said fluidized-bed reforming furnace, and
a controller for regulating feed of the heating fuel to be fed by the fuel feeder to the fluidized bed combustion furnace, into which the temperature in the fluidized-bed reforming furnace sensed by the temperature sensor and the concentration of the reformed gas sensed by the concentration sensor are inputted, the controller regulating the amount of the heating fuel to be fed by the fuel feeder such that the temperature in the fluidized-bed reforming furnace sensed by the temperature sensor is kept to a predetermined temperature and the concentration of the reformed gas sensed by the concentration sensor is kept to a predetermined concentration.

2. A circulating fluidized-bed reformer as claimed in claim 1, further comprising an air regulator for regulating fluidizing air to be fed to said fluidized-bed combustion furnace, a circulating amount of the circulating particles between the fluidized-bed combustion and reforming furnaces being regulated by the air regulator.

3. A circulating fluidized-bed reformer as claimed in claim 1, wherein the raw material fed to said fluidized-bed reforming furnace is at least one of hydrocarbon gas, heavy oil and oil refining pitch.

4. A circulating fluidized-bed reformer as claimed in claim 1, wherein the heating fuel fed to said fluidized-bed combustion furnace is at least one of waste, sludge, coal and said raw material to be reformed.

5. A circulating fluidized-bed reformer as claimed in claim 1, wherein said circulating particles are of catalyst having reformation stimulating activity.

* * * * *